Aug. 9, 1966 W. KLOSSIKA 3,265,860
METHOD OF MARKING SEMICONDUCTOR CRYSTALS
Filed July 8, 1963
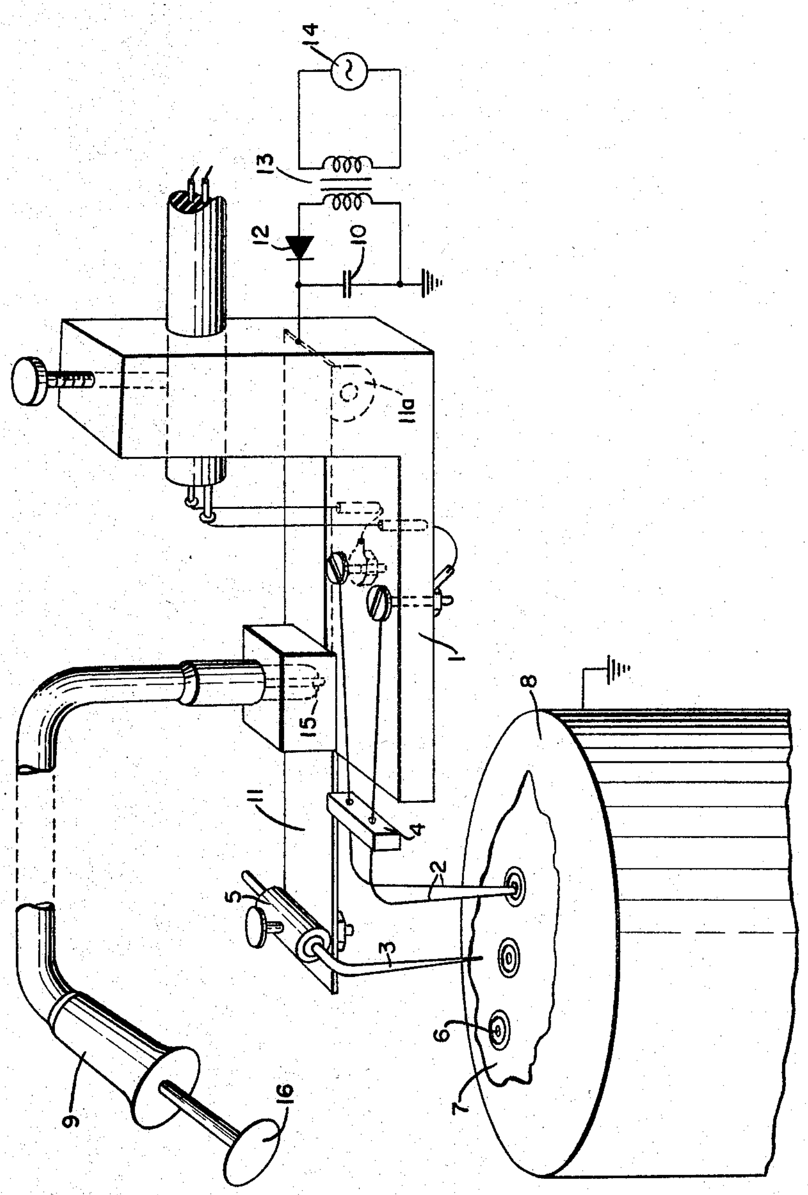
INVENTOR
Walter Klossika
BY Spencer & Kaye
ATTORNEYS

United States Patent Office 3,265,860
Patented August 9, 1966

3,265,860

METHOD OF MARKING SEMICONDUCTOR CRYSTALS

Walter Klossika, Heilbronn (Neckar), Germany, assignor to Telefunken Patentverwertungs-G.m.b.H., Ulm (Danube), Donau, Germany Filed July 8, 1963, Ser. No. 293,535
Claims priority, application Germany, July 11, 1962, T 22,452
2 Claims. (Cl. 219—384)

This invention pertains to the marking of the body of semiconductor devices which differ from other devices, for example in regard of their electrical properties. Particularly, the invention pertains to the marking of individual systems on a wafer which have to be rejected.

The present semiconductor technology allows the simultaneous production of a large number of single devices on one wafer. After the simultaneous production step on the wafer the wafer has to be broken into the individual systems.

The separating of the wafer for example is performed with an adhesive tape on which wafers are put. The wafers which now stick to the adhesive tape have to be scored and broken along the score lines. The individual systems are generally measured before separating the wafer. The systems in the case of transistors are measured by making contact to emitter, base and collector of a single system by means of needles or whiskers. Such a test shows the systems which do not pass the necessary specifications. Such systems are then marked by the use of a colour pen as for example an ink marker which is brought onto the surface of the rejects.

After breaking the wafer into the individual pellets they are separated from the adhesive tape by dipping the systems in a hot solution for example sodium hydroxide. The disadvantage, however, of the described method is the fact that not only the adhesive tape but also the marking colour will be dissolved at the same time. Moreover, it is very difficult to mark semiconductor systems with very small dimensions as used today.

It is an important object of the invention, therefore, to provide a method for a more suitable marking of the foresaid systems on the semiconductor wafer.

It is still another important object of the invention to prevent the influence of the spreading of the marking ink dots.

According to a preferred method of the invention an electrode is placed onto this part of the surface of the semiconductor crystal to be marked and there is applied through this electrode such a current that the surroundings of the electrode onto the part on which the electrode is placed visually differ from the other part of the semiconductor surface.

Such a conversion of a certain area of the semiconductor surface for example can be performed by a whisker which is placed onto the semiconductor surface which has to be marked when sending a certain current impulse through the whisker. By use of a certain current flow it can be achieved that the semiconductor surface is scorched in the very neighbourhood of the whisker. For the marking of the single system according to the invention even the same whisker which is provided for the electric measurement can be used. In this case the marking follows immediately after the said measurement by applying a suitable current impulse following the measuring current.

For the production of the above mentioned devices the wafers are sliced from a single crystal which can be achieved for example by the crystal drawing method. The advantage of the present day wafer technology is the simultaneous processing of a large number of individual systems. For instance it is possible to produce the emitter base junctions as well as the collector base junctions for all systems by one diffusion step.

After the last simultaneous process of the wafer the individual systems have to be broken of the wafer. For this purpose the semiconductor wafers carrying the individual systems are stuck onto the adhesive tape and scored by a diamond stylus. Before breaking the wafer along the score lines the electrical characteristics of the single crystals are measured.

The single figure shown in the accompanying drawing is a diagrammatic perspective view illustrating an apparatus by means of which the method according to the present invention may be carried out, the figure also showing, in schematic diagram form, an exemplary circuit such as may be used in conjunction with the apparatus.

Referring now to the drawing, the same shows a device comprising a support 1 carrying two whiskers 2 for carrying out measurements and one whisker 3 for doing the marking. The two whiskers 2 are held in a fixture 4 while the marking whisker 3 is held by a holder 5. Also shown are three transistors 6 on a wafer 7 which is placed on the top of a socket 8. The two meausring whiskers 2 are provided for measuring the so-called emitter diode characteristics collector diode characteristics. After this measurement has proven any given transistor to be bad, a current pulse is applied by means of the marking whisker 3, this being accomplished when a mechanical switch 9 is actuated. This actuation occurs when the head 16 of, for example, a conventional Bowden cable, as illustrated, is depressed, thereby causing the other end 15 of the cable to engage and depress a strip 11 which itself is mounted at one end thereof, shown at 11*a*, on the support 1. Inasmuch as the holder 5 holding the marking whisker 3 is carried at the free end of the strip 11, as depicted in the drawing, the whisker 3 will, upon actuation of the mechanical switch 9, be brought into physical contact with the transistor 6 that tested bad, such transistor having, in the meanwhile, been brought into alignment with the marking whisker 6.

Electrical energy for the marking pulse is supplied in any suitable manner, e.g., in the manner shown in Patent No. 2,646,609, dated July 23, 1953, in that the strip 11 is connected to a capacitor 10, both this capacitor 10 and the socket 8 being grounded so that the charge on the capacitor 10 is used to cause a current to flow through the whisker 3, it being this current which brings about the scorching that gives a visual indication of the fact that a certain area of the wafer 7 has, in fact, been marked.

The capacitor 10 itself may be charged in any one of several ways well known in the art, for example, by being connected in series with a rectifier 12 across the secondary winding of a step-up transformer 13 whose primary winding is connected to a source of alternating current 14. The rectifier 12 causes the capacitor 10 to be charged up only during one half wave of each full wave of the alternating current.

After probing and marking the individual systems are separated by breaking as described above.

What I claim as new and desire to secure by Letters Patent of the United States is:

1. A method for marking semiconductor crystals with specific properties, in particular with specific electrical properties, which comprises placing a whisker electrode onto a part of the surface of the semiconductor crystal which is to be marked and applying to this whisker electrode such a current that said part of the surface of semiconductor crystal is scorched, in consequence of which the surroundings of the electrode on the part on which the whisker electrode is placed visually differs from the other part of the semiconductor surface.

2. A method according to claim 1, wherein the semiconductor crystal is a wafer having a plurality of individual systems, wherein said systems of the common wafer are checked one after each other and wherein those systems which have to be rejected are marked by current impulses.

References Cited by the Examiner

UNITED STATES PATENTS

| | | | |
|---|---|---|---|
| 1,493,014 | 5/1924 | Boyle | 219—384 X |
| 1,810,212 | 6/1931 | Hinds | 219—384 X |
| 2,035,474 | 3/1936 | Hay | 346—74 |
| 2,316,388 | 4/1943 | Annis | 219—68 |
| 2,492,214 | 12/1949 | Fonda | 204—143 |
| 2,539,874 | 1/1951 | Stockfleth | 219—270 |
| 2,646,609 | 7/1953 | Heins | 29—25.3 |
| 2,940,024 | 6/1960 | Kurshan | 204—143 X |
| 3,001,112 | 9/1961 | Murad | 204—143 X |
| 3,075,903 | 1/1963 | Dacosta et al. | 204—143 |

RICHARD M. WOOD, *Primary Examiner.*

V. Y. MAYEWSKY, *Assistant Examiner.*